US010652121B2

(12) United States Patent
Caron (10) Patent No.: US 10,652,121 B2
(45) Date of Patent: May 12, 2020

(54) TOGGLING ENHANCED MODE FOR A CODEC (71) Applicant: Genband US LLC, Plano, TX (US)

(72) Inventor: Francois Caron, Montreal (CA)

(73) Assignee: GENBAND US LLC, Plano, TX (US)

( * ) Notice: Subject to any disclaimer, the term of this patent is extended or adjusted under 35 U.S.C. 154(b) by 144 days.

(21) Appl. No.: 15/905,450

(22) Filed: Feb. 26, 2018

(65) Prior Publication Data
US 2019/0268250 A1 Aug. 29, 2019

(51) Int. Cl.
H04L 12/26 (2006.01)
H04M 7/00 (2006.01)
G10L 19/24 (2013.01)
H04L 1/00 (2006.01)
G10L 19/22 (2013.01)
G10L 19/005 (2013.01)

(52) U.S. Cl.
CPC .......... H04L 43/0829 (2013.01); G10L 19/22 (2013.01); G10L 19/24 (2013.01); H04L 1/0009 (2013.01); H04L 43/16 (2013.01); H04M 7/0072 (2013.01); H04M 7/0084 (2013.01); G10L 19/005 (2013.01)

(58) Field of Classification Search
CPC ... H04L 43/0829; H04L 1/0009; H04L 43/16; G10L 19/24; H04M 7/0084; H04M 7/0072
See application file for complete search history.

(56) References Cited

U.S. PATENT DOCUMENTS

| 9,582,272 | B1* | 2/2017 | Doucette | G06F 9/5044 |
| 10,135,712 | B2* | 11/2018 | Wu | H04L 43/14 |
| 2011/0090911 | A1* | 4/2011 | Hao | H04L 12/4633 370/395.53 |
| 2012/0020353 | A1* | 1/2012 | Twitchell | H04L 67/06 370/389 |
| 2012/0265523 | A1* | 10/2012 | Greer | G10L 19/24 704/201 |
| 2013/0046896 | A1* | 2/2013 | Ball | H04L 65/605 709/228 |
| 2013/0086202 | A1* | 4/2013 | Connelly | G06F 9/45558 709/217 |

(Continued)

OTHER PUBLICATIONS

Ramo et al. *"EVS Channel Aware Mode robustness to Frame Erasures"*, Apr. 19, 2016, 24 pages, Nokia Technical Paper.
PCT International Searching Report, dated May 14, 2019, 7 pages.

*Primary Examiner* — Wutchung Chu
(74) *Attorney, Agent, or Firm* — Haynes and Boone, LLP (57) ABSTRACT

According to one example, a method includes processing a communication session with a first virtual machine of a plurality of virtual machines associated with a network node and monitoring packet loss on a leg of the communication session between a first endpoint and a second endpoint. The method further includes, in response to determining that the packet loss exceeds a first threshold, toggling on an enhanced mode for a codec associated with the communication session, the enhanced mode providing increased error resilience. The method further includes, in response to determining that the toggling on the enhanced mode causes the first virtual machine to exceed a processing capacity threshold, moving the communication session to a second virtual machine of the plurality of virtual machines.

20 Claims, 5 Drawing Sheets (56) References Cited

U.S. PATENT DOCUMENTS

| | | | |
|---|---|---|---|
| 2013/0283160 A1* | 10/2013 | Ball | H04L 65/605 |
| | | | 715/716 |
| 2014/0075439 A1* | 3/2014 | Wang | G06F 9/45558 |
| | | | 718/1 |
| 2016/0149788 A1* | 5/2016 | Zhang | H04L 43/10 |
| | | | 709/224 |
| 2016/0182288 A1* | 6/2016 | Maenpaa | H04L 67/1004 |
| | | | 709/220 |
| 2016/0342437 A1* | 11/2016 | Khemani | G06F 9/45558 |
| 2017/0169833 A1* | 6/2017 | Lecomte | G10L 19/005 |
| 2017/0195168 A1* | 7/2017 | Gu | H04L 41/0668 |
| 2018/0026746 A1* | 1/2018 | Bruhn | H04L 1/0082 |
| | | | 714/746 |
| 2018/0048748 A1* | 2/2018 | Lundstrom | H04L 65/80 |

* cited by examiner

TOGGLING ENHANCED MODE FOR A CODEC

TECHNICAL FIELD

The present description relates, in general, to network communications and, more specifically, to techniques for toggling an enhanced mode for a media codec.

BACKGROUND

Internet protocol (IP) networks and other types of networks can be used to carry data for different types of calls. Various types of calls include voice and video communications and conferencing, and streaming services including audio and video streaming. Audio and video data are typically encoded for transmission via these networks by one or more codecs along the way. A codec may include hardware or software used to encode and decode data, such as audio and/or video data in a signal. A media gateway/media gateway controller and/or a session border controller, located along a network path between the two endpoints, may perform different types of services for the transmission of calls, including transcoding and encryption.

The impact on the internal resources available to the network component varies, depending upon the codec(s) used. Depending upon which codecs are used, transcoding or other services may be necessary at the network component. As the volume of media traffic carried by communications networks continues to increase, the need for network components to provide ever greater capability to handle media traffic in a manner that more efficiently uses resources internal to network components increases as well.

Various codecs may include certain features designed to improve call connectivity and reliability. For example, the Enhanced Voice Service (EVS) codec includes a "channel aware mode." The channel aware mode packages data in a way such that it can more easily be recovered if a particular packet is lost during transit. Thus, the channel aware mode utilizes additional resources to improve call quality. It is desirable however for communication service providers to improve call quality while minimizing the use of additional resources.

BRIEF DESCRIPTION OF THE DRAWINGS

The present disclosure is best understood from the following detailed description when read with the accompanying figures.

SUMMARY

According to one example, a method includes processing a communication session with a first virtual machine of a plurality of virtual machines associated with a network node and monitoring packet loss on a leg of the communication session between a first endpoint and a second endpoint. The method further includes, in response to determining that the packet loss exceeds a first threshold, toggling on an enhanced mode for a codec associated with the communication session, the enhanced mode providing increased error resilience. The method further includes, in response to determining that the toggling on the enhanced mode causes the first virtual machine to exceed a processing capacity threshold, moving the communication session to a second virtual machine of the plurality of virtual machines.

According to one example, a system includes a processor and a memory that includes machine readable instructions that when executed by the processor, cause the system to: process a communication session between a first endpoint and a second endpoint over a network and toggle on an enhanced mode for a codec associated with the communication session in response to detecting a first change in network conditions. The system is further to move the communication session from being processed by a first virtual machine to a second virtual machine in response to determining that toggling on the enhanced mode increases processing capacity of the first virtual machine above a processing capacity threshold.

According to one example, a computer program product includes machine-readable instructions on a non-transitory storage medium of a network node for facilitating a communication session among endpoints in a communication network. The computer program product includes code to monitor packet loss on a leg of the communication session between a first endpoint and a second endpoint, the communication session being processed by a first virtual machine of a plurality of virtual machines associated with the network node. The computer program product further includes code to toggle on an enhanced mode for a codec associated with the communication session in response to determining that the packet loss exceeds a high threshold, the enhanced mode providing increased error resilience and code to move the communication session to a second virtual machine of the plurality of virtual machines in response to determining that the first virtual machine has exceeded a processing capacity threshold after toggling on the enhanced mode.

DETAILED DESCRIPTION

The following disclosure provides many different embodiments, or examples, for implementing different features. Specific examples of components and arrangements are described below to simplify the present disclosure. These are merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

As described above, it is desirable for communication service providers (also referred to as carriers) to improve call quality while minimizing the use of additional resources. Providing a communication service often involves a transcoding process. Transcoding is the process by which data is transferred from one coding format (i.e., codec) to another coding format. Carriers typically require high volumes of transcoding processing power during peak hours.

This is an expense for carriers. Thus, carriers seek to use codecs and transcoding processes that minimize processing resources.

EVS (Enhanced Voice Services) is a new speech codec that introduces an enhanced mode referred to as "Channel Aware Mode." The Channel Aware Mode increases the amount of robustness in call processing to recover data lost during transmission. In other words, the Channel Aware Mode is a tool to combat transmission errors in poor network conditions. Transmission errors could be, but are not limited to, discarded packets due to bit errors or packets arriving late (packet arrival timing is critical in real-time communications systems).

The Channel Aware Mode, while providing increased call quality in poor network conditions, increases the computational complexity for call processing systems. The added computational complexity results from redundant information being placed into packets. This redundant information is useful to conceal transmission errors and provide superior audio quality in harsh transmission conditions. However, transcoding data that is being transmitted with the Channel Aware mode utilizes more processing resources.

The added computational complexity is independent of network conditions. In other words, with Channel Aware Mode on, redundant information is transmitted in ideal network conditions, regardless of whether it is useful. Thus, in good network conditions, the Channel Aware Mode utilizes more processing resources but does not provide much value.

Accordingly, the present disclosure is directed to toggling the enhanced mode (e.g., Channel Aware Mode) on or off in response to certain conditions. According to one example, a network node, such as a MRFP processes a call between a first endpoint and a second endpoint. The processing of the call may be performed by one of several virtual machines. When the call is first established, the default may be for the channel aware mode to be off. During the call, the network node monitors packet loss on at least one leg of the call. If the packet loss exceeds a particular threshold, then it becomes desirable to use the channel aware mode to add increased call robustness. The channel aware mode is then toggled on. Turning on the enhanced mode increases the computational resources utilized by the virtual machine. If it is determined that turning on the enhanced mode for that particular call increases the computational load above a threshold, then that call can be moved to a different virtual machine that has spare capacity.

Figure 1:
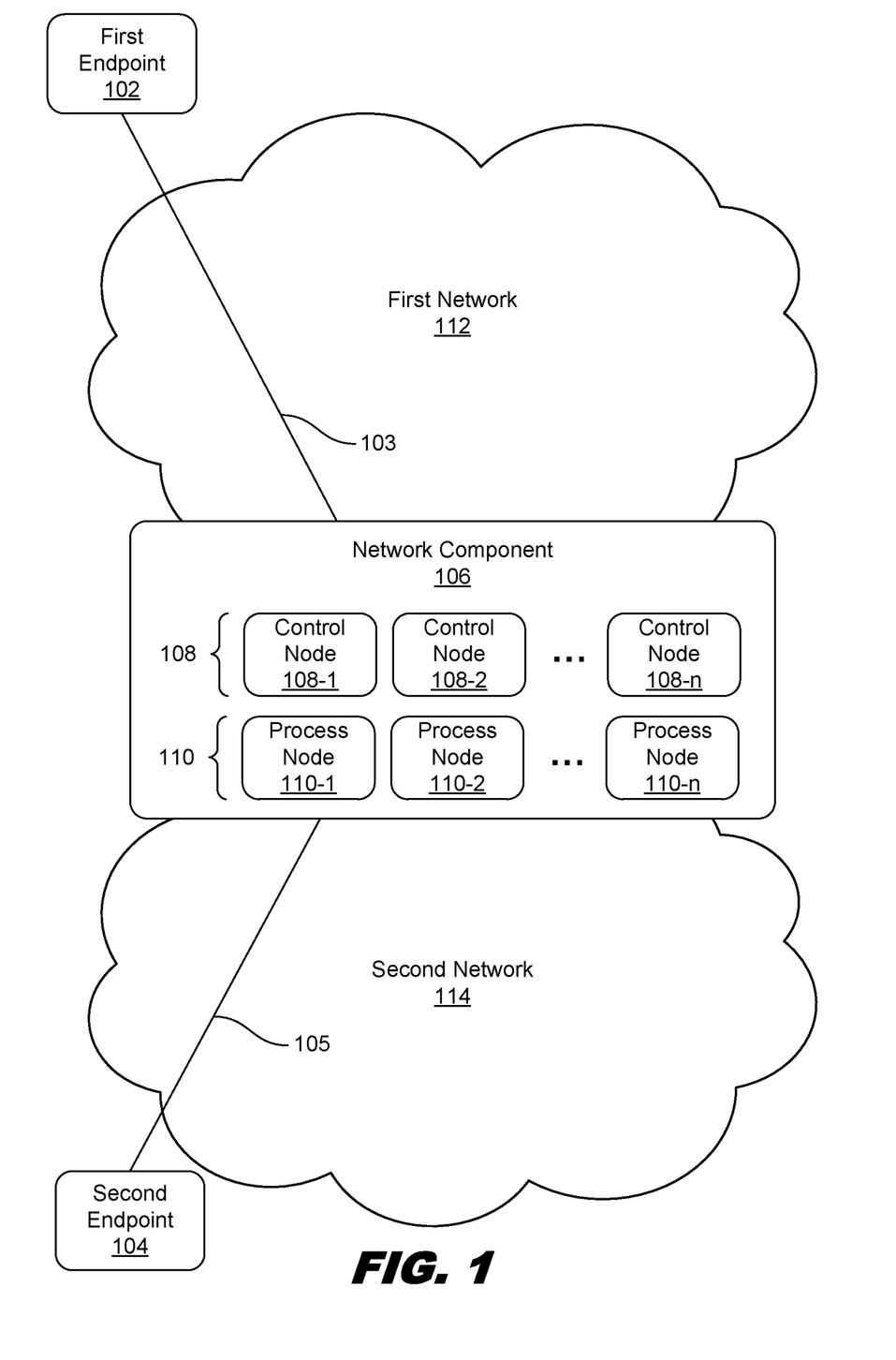
FIG. 1 is an illustration of a network architecture, according to an example of principles described herein.

FIG. 1 is a diagram showing an illustrative network component 106 that bridges a first network 112 and a second network 114. According to the present example, the network component 106 handles traffic passing between the first network 112 and the second network 114. For example, the network component may handle Voice over Internet Protocol (VoIP) traffic between a first endpoint 102 and a second endpoint 104.

The first network 112 may be a private network. A private network uses a private logical address (e.g., Internet Protocol (IP) address)). Such networks are typically used for a personal home network, an office network, or an enterprise Local Area Network (LAN). Endpoint devices such as endpoint 102 may be connected to the private network 112. The private network 112 may also be connected to a public network such as the Internet. Thus, devices on the first network 112 may have access to the Internet.

The second network 114 may be a public network such as the Internet. Endpoint devices such as endpoint 104 may connect to the public second network 114 through an Internet service provider. Through both networks 112, 114, the endpoints 102, 104 may communicate. A telecommunication service may utilize telecommunication components such as the network component 106 to process data passing between two different networks. The network component 106 may include several nodes, both physical and virtual, each node being able to handle a predefined number of subscribers. For example, each node may be able to handle 10,000 calls.

The endpoints 102, 104 may be user devices such as desktop computers, laptop computers, mobile phones, or tablets. In the present example, endpoint 102 is in communication with the network component 106 through the first network 112. Endpoint 104 is in communication with the network component 106 through the second network 114.

The network component 106 includes a plurality of control nodes 108 (108-1, 108-2 . . . 108-$n$) and a plurality of process nodes 110 (110-1, 110-2 . . . 110-$n$). In one example, the process nodes 110 are virtual nodes. In one example, the control nodes are signaling nodes and the process nodes 110 are media nodes. To establish a communication session between the two endpoints 102, 104, any one of the control nodes 108 establishes a connection between the two endpoints. Then, any one of the process nodes 110 may process traffic between the two endpoints. The communication session may have a first leg 103 in the first network 112 and a second leg 105 in the second network 114.

As a further example, endpoints 102, 104 may be analog or digital telephones. In one embodiment, the network component 106 may be a media gateway (MG). A MG may perform various services for a call originating from or routing to any of endpoints 102,104, such as transcoding a call for disparate networks or devices. Transcoding may refer to a conversion between different transmission and/or coding types for a call and may include transrating (a bit-rate conversion for a call). The network component 106 is not limited to any particular hardware type, but may be implemented in some embodiments using commodity servers running an operating system (e.g., Linux) with SBC, MG, MGC, MRFC, and/or MRFP functionality included as applications running on top of the operating system. Various embodiments may include the SBC, MG, MGC, MRFP and/or MRFC functionality as computer-readable code that is executed by processors of the network components.

The networks 112/114 may include any kind of network such as a Local Area Network (LAN), a cellular data network (e.g., an LTE network or a 3G network), the Internet, and/or the like, utilizing various types of network protocols, such as IP or asynchronous transfer mode (ATM) to name just a few examples.

In an embodiment, a call may originate from endpoint 102 towards endpoint 104. As an example, the call may be made using SIP. When using SIP, an INVITE with a Session Description Protocol (SDP) offer attached to the message from endpoint 102.1 reaches the network component 106. SDP is used for call session initialization, including negotiation of parameters for the call session. Among other things, the INVITE message may include a list of codecs available to the endpoint 102.1. Some examples of available codecs could include audio codecs such as Enhanced Variable Rate Codec (EVRC), Adaptive Multi-Rate (AMR), G.711, Internet Low Bit Rate Codec (iLBC), AMR-WB, G.729, and/or video codecs such as H.261, H.263, H.264, Moving Picture Experts Group (MPEG), or VP8, to name just a few examples of each. In the case of LTE, the available codecs may include EVS. Codecs, such as those listed above, may have different impacts on the network component 106's internal resources, such as one or more of its DSP, bandwidth, hardware accelerator, memory, CPU, etc. Different codec parameters, such as bandwidth and bitrate, may also affect usage of internal resources of network component 106.

The network component 106 may have a list of codecs that are available to the destination endpoint 104. In embodiments of the present disclosure, the network component 106 determines the utilization of one or more of its internal resources by measurement or estimation. Based on the utilization determination, the network component 106 may select codec parameters to balance resource usage and call quality should transcoding be used.

Figure 2:
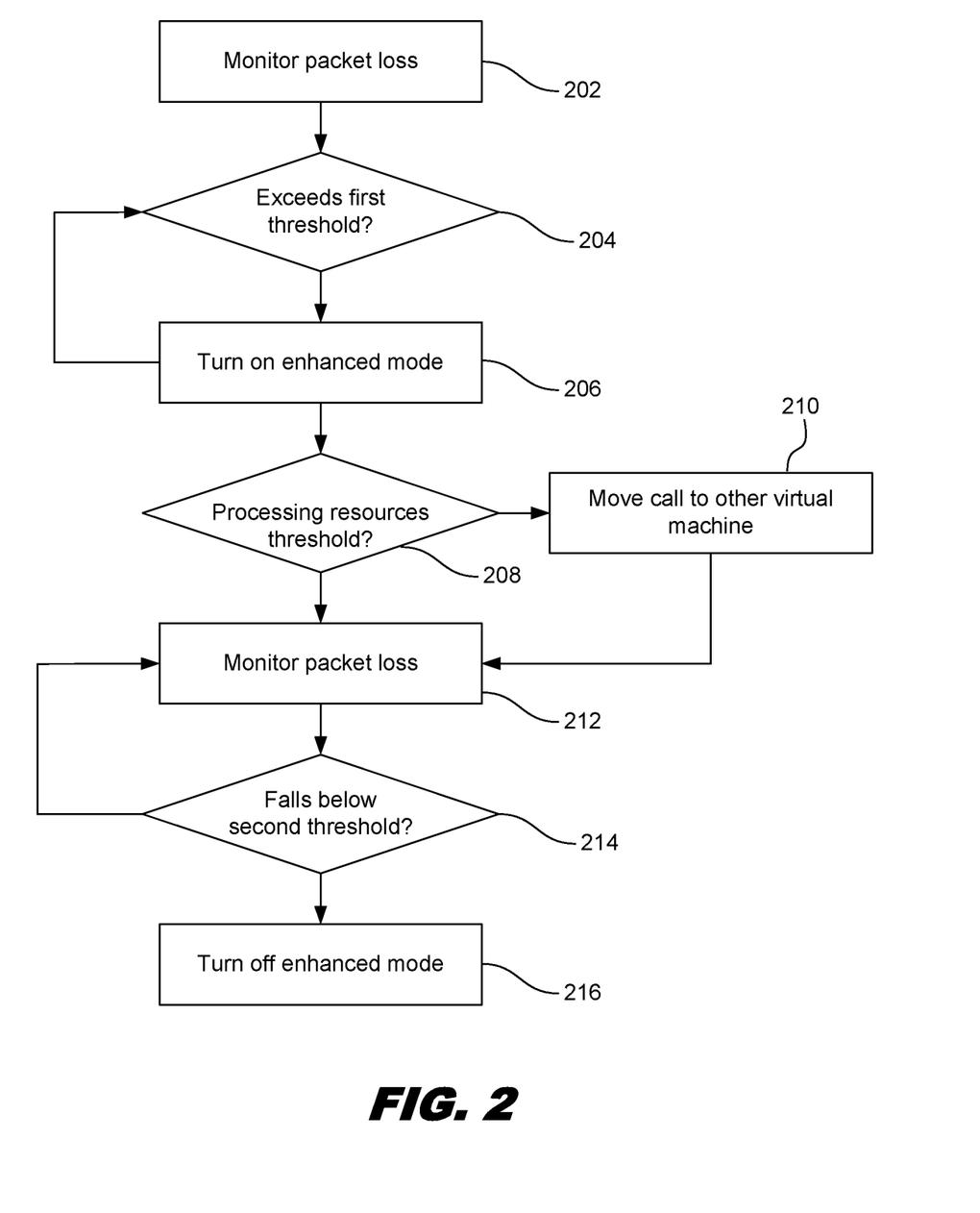
FIG. 2 is a flowchart showing an illustrative method for toggling an enhanced mode, according to an example of principles described herein.

FIG. 2 is a flowchart showing an illustrative method for toggling an enhanced mode. According to the present example, the method 200 includes a process 202 for monitoring packet loss. This may be performed by a process node such as an MRFP (Media Resource Function Processor) node. In one example, the process node monitors packet loss for a specific call leg of a call between a first endpoint and a second endpoint. That call leg may be handled by one of a plurality of virtual machines associated with the process node. In other words, the process node may utilize multiple virtual machines for processing calls. Additionally, the process node may monitor the packet loss for each one of the calls on each one of the virtual machines separately. Because each call being handled by the process node may have a different route through the network, different calls may experience different levels of packet loss.

Packet loss may occur for a variety of reasons. In some examples, signal interference can cause packets to drop. Specifically, some networks include wireless portions. Communication signals for wireless network may be prone to interference and other anomalies that cause the data within the signals to be lost. In some cases, network congestion can result in packet loss. This is because real time communication sessions may drop packets that arrive too late.

At process 204, the process node determines whether packet loss exceeds a first threshold. If the first threshold has not been exceeded, then the process node keeps the enhanced mode off. If, however, the packet loss exceeds the first threshold, then the process node turns on the enhanced mode at process 206. The first threshold may be a customizable value. Different carriers may choose to set different threshold values for turning on the enhanced mode.

Turning on the enhanced mode may be done in one of a variety of manners. In some examples, when the call is first being established, the process node they negotiate the ability to toggle the enhancement on and off during the call. If so, then the process node can use this mechanism. In some examples, the process node may send a SIP invite message to continue the call with the enhanced mode on. In some examples, this may involve renegotiating the codec used to continue the call. Other mechanisms for turning on the enhanced mode are contemplated.

The enhanced mode involves a number of additional tasks that provide increased error resilience. For example, when a codec is using the channel aware mode, data is encoded such that data in a particular packet is redundantly placed in neighboring packets (i.e., packets that are sent after the particular packet). Thus, if the particular packet is lost, it can be partially reconstructed from data in neighboring packets.

As described above, turning on enhanced mode for a particular call increases the processing resources used to process that call. Thus, at process 208, the process node determines whether the processing demand on that node exceeds a threshold. If the processing demand has not exceeded the threshold, then the process node continues to process the call as normal. If, however, the processing demand does in fact exceed the threshold, then the process node moves the call having the newly toggled on enhanced mode to a different virtual machine. The different virtual machine may be one that is already provisioned and thus moving the call to that virtual machine is seamless.

In other words, moving the call from one virtual machine to another is transparent to the end devices 102, 104 as the network addresses associated with the call between the endpoints do not change when the call is transferred. Specifically, the call is transferred without changing network addresses such as the IP addresses and port numbers of the various devices associated with the call. Specifically, each of the endpoints 102, 102 has an IP address and port number used to communicate over the communication session between the endpoints. Additionally, each network component (e.g., 106) along the communication session may have an IP address and port number for sending and receiving data to and from the first endpoint 102, as well as a different IP address and port number for sending and receiving data to and from the second endpoint 104. When the communication session is transferred from one virtual machine to another, none of these network addresses are changed.

As will be explained in further detail below in the text accompanying FIGS. 4A and 4B, the process node may be embodied as multiple virtual machines. Each virtual machine may process a certain number of calls. Each virtual machine is a particular processing capacity. If the capacity for the virtual machine is exceeded due to one of the calls it is processing being switched to enhanced mode on, then one or more calls from that virtual machine may be transferred to another virtual machine that does have capacity. In some examples, a call other than the one recently having its enhanced mode turned on is passed to a different virtual machine as a result of a call having its enhanced mode turned on.

After the call has been transferred in process 210, the process node continues to monitor packet loss at process 212. Packet loss may change over time as network conditions change. Thus, improvement or conditions may make the use of the enhanced mode unnecessary.

At process 214 the process node determines whether packet loss has fallen below a second threshold. If the process node determines that packet loss has not fallen below the second threshold, then the process node keeps the enhanced mode on. If, however, the process node determines that packet loss has in fact fallen below the second threshold, then the process node toggles off the enhanced mode process 216.

Turning off the enhanced mode may be done in one of a variety of manners. In some examples, when the call is first being established, the process node they negotiate the ability to toggle the enhancement on and off during the call. If so, then the process node may use this mechanism to turn off enhanced mode. In some examples, the process node may send a SIP invite message to continue the call with the enhanced mode off. In some examples, this may involve renegotiating the codec used to continue the call. Other mechanisms for turning off the enhanced mode are contemplated.

Figure 3:
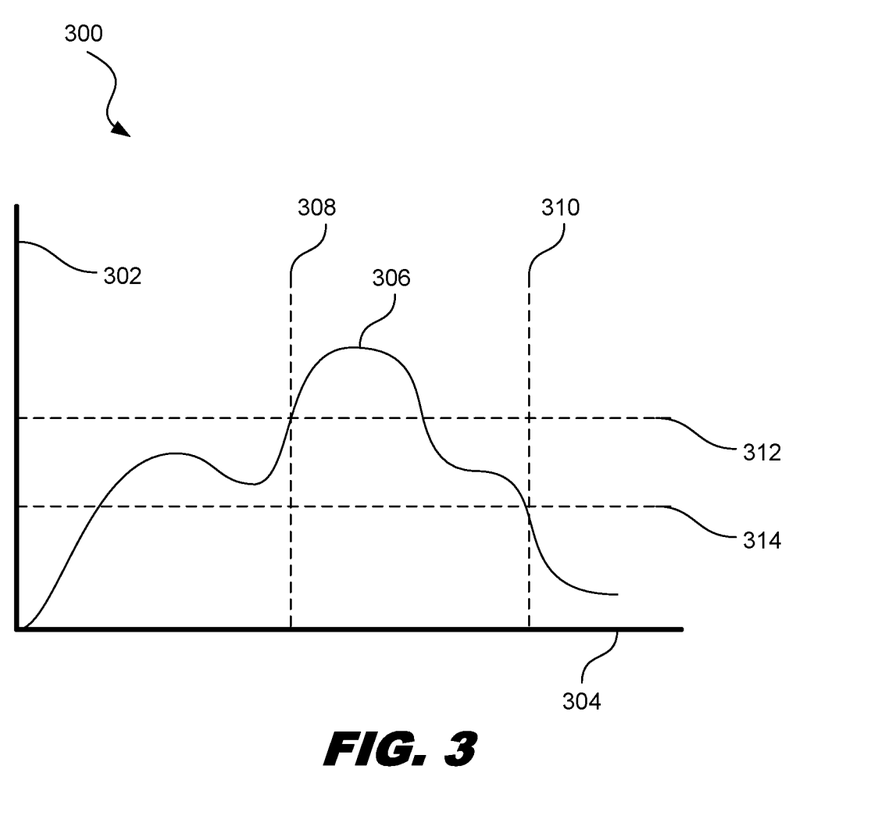
FIG. 3 is a graph showing toggling points as packet loss changes over time, according to an example of principles described herein.

FIG. 3 is a graph 300 showing toggling points as packet loss changes over time. According to the present example, the vertical axis 302 represents packet loss and the horizontal axis 304 represents time. Thus, line 306 represents packet loss over time. The graph 300 includes a first threshold 312 and a second threshold. In the present example, the first threshold 312 is associated with toggling enhanced mode on.

Additionally, the second threshold 314 is associated with toggling the enhanced mode off.

The various thresholds 312, 314 may be set in customizable by the carrier. These thresholds may also be dynamic and change over time. For example, the thresholds 312, 314 may change based on a variety of factors, including the cost of processing resources, the current network conditions, the geographic locations of the endpoints, the time of day, the day of the week, month, or year, and other factors. In some examples, the thresholds 312, 314 may be identical.

At point 308, packet loss exceeds the first threshold 312. This would trigger turning on the enhanced mode as discussed above at process 206. At point 310, the packet loss falls below the second threshold 314. This would trigger turning off the enhanced mode as discussed above at process 216.

Figure 4A:
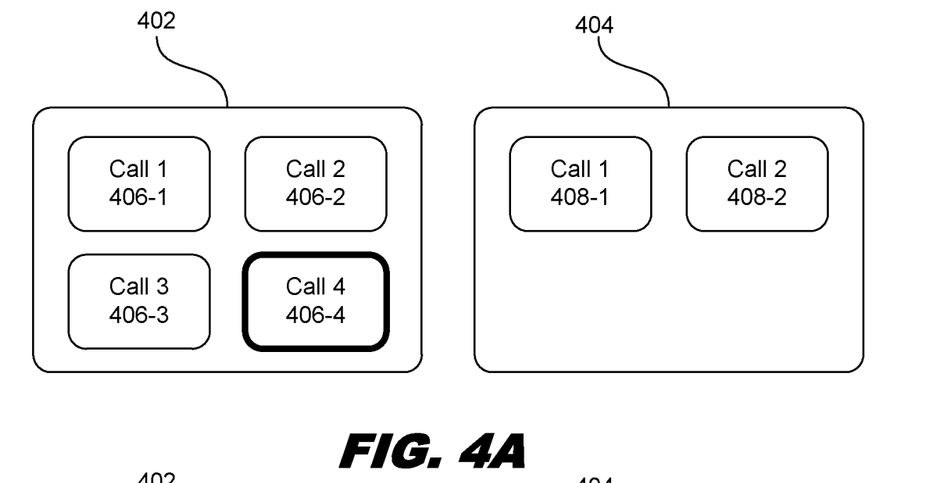
FIGS. 4A, 4B, and 4C are diagrams showing call handling, according to an example of principles described herein.
Figure 4B:
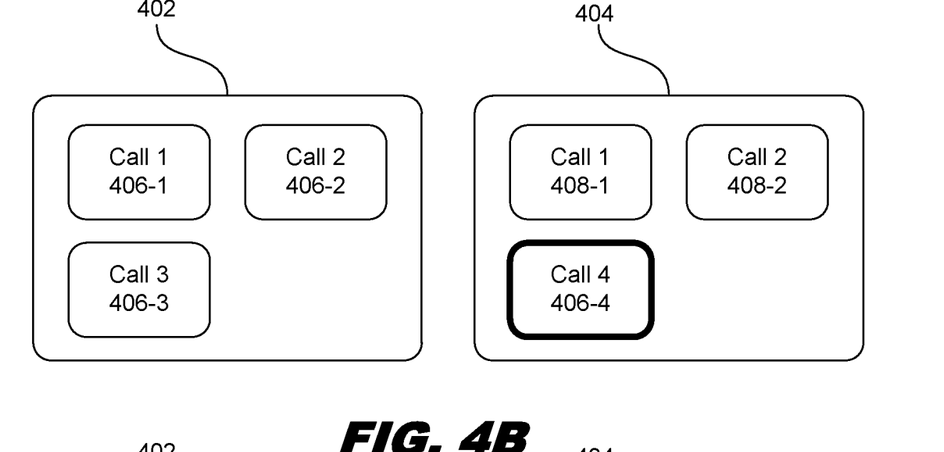
Figure 4C:
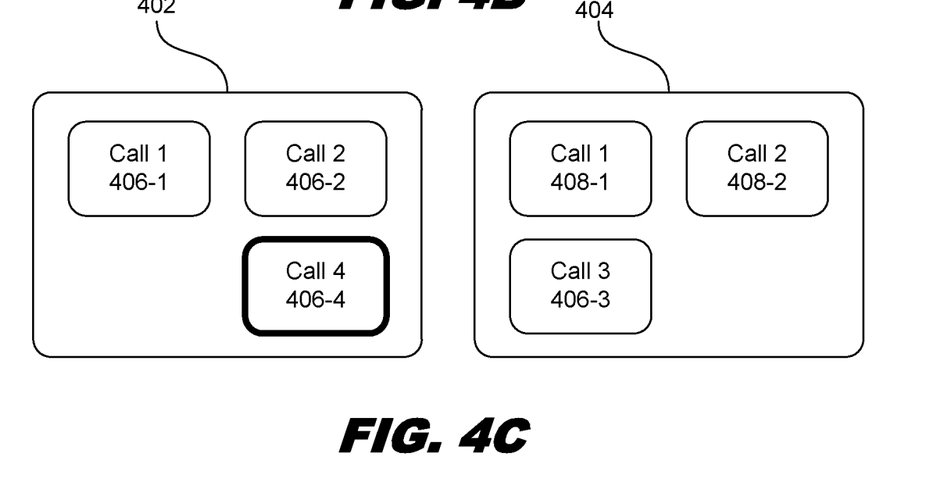

FIGS. 4A, 4B, and 4C are diagrams showing call handling. FIG. 4A illustrates four calls handled by a first virtual machine 402 and two calls handled by a second virtual machine. It is noted that practical implementations will include virtual machines with much greater call capacity, such as 10,000 calls. The examples shown here are for discussion purposes.

In the present example, call 4 (406-4) has its enhanced mode toggled on as a result of packet loss on that call. In one example, turning on the enhanced mode for call 4 causes the first virtual machine 402 to exceed processing capacity. However, virtual machine 404 has spare capacity. Accordingly, in one example, call 4 is moved to virtual machine 404 as shown in FIG. 4B. Call 1 (406-1), call 2 (406-2), and call 3 (406-3) remain on virtual machine 404.

FIG. 4C shows an example in which the call that is transferred to the different virtual machine is not the call for which enhanced mode was turned on. Specifically, call three is moved from virtual machine 402 to virtual machine 404 after the enhanced mode is turned on for call 4.

In some examples, if all virtual machines associated with a particular process node are at full capacity, then an additional virtual machine may be provisioned. Conversely, if the overall capacity across multiple virtual machines falls below a certain threshold, then a particular virtual machine may be decommissioned. Such elasticity may be provided by, for example, a network that utilizes network function virtualization (NFV).

Figure 5:
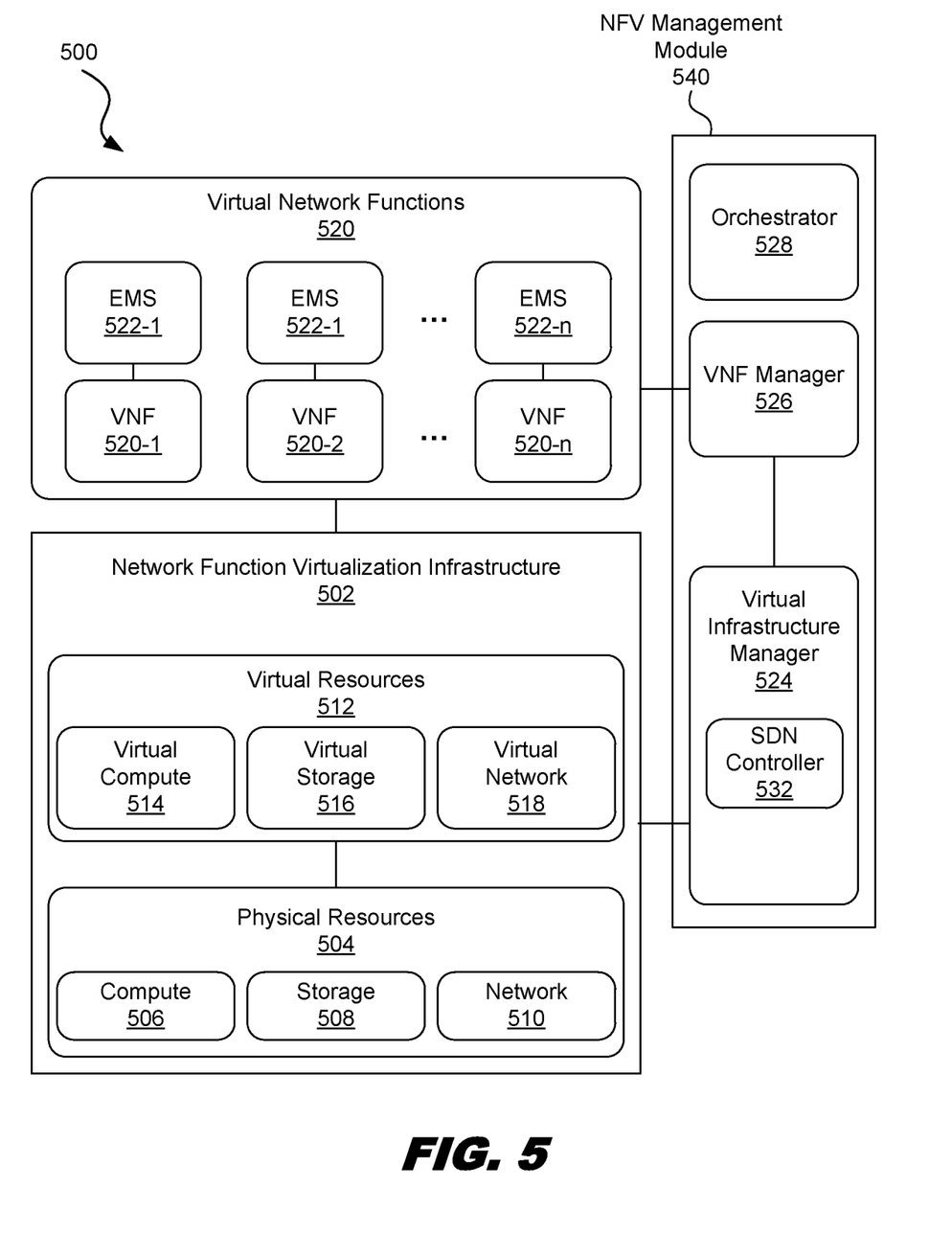
FIG. 5 is a diagram showing NFV, according to one example of principles described herein.

FIG. 5 is a diagram showing network function virtualization 500. According to the present example, a Network Function Virtualization Infrastructure (NFVI) 502 is used to provide network function virtualization 500. The NFVI 502 provides the infrastructure for a number of VNFs 520. Both the VNFs 520 and the NFVI 502 are managed by an NFV management module 540.

The NFVI 502 includes a set of physical resources 504 that are used to provide a set of virtual resources 512. The physical resources 504 include computing resources 506, storage resources 508, and network resources 510. Other resources, such as input/output resources are contemplated as well. The physical resources 504 are typically embodied as a plurality of physical computing systems, sometimes referred to as servers, within a datacenter. For example, a datacenter may include several servers that are positioned on racks and interconnected via physical network cables. Each of the servers includes hardware including a physical processor, a memory, and a network interface. Some servers may be designed primarily for processing power and some servers may be designed primarily for storage. In one example, the servers are commodity servers that include a number of physical processors, such as x86 processors. The servers utilize an operating system, such as Linux, to provide various applications with access to the hardware of the servers. More specifically, the operating system will schedule processing tasks on the physical processor of the server and allocate physical memory for use by the application.

The computing resources 506 include a plurality of processors within a plurality of physical computing systems. The processors are designed to process machine readable instructions to perform specifically designed tasks. The processors can be designed to work together to provide parallel processing capabilities.

The storage resources 508 include various types of memory. Some types of memory, such as non-volatile types of memory, typically have large storage volume but relatively slow performance. The storage resources 508 may include a series of hard disk drives or solid state drives that store data in the form of machine readable instructions as well as large amounts of data. The storage resources 508 may also include volatile forms of memory, such as those used for Random Access Memory (RAM), which are optimized for speed and are often referred to as "working memory."

The network resources 510 include the physical network infrastructure that provides communication between the physical computing systems as well as to an external network such as the Internet. The physical network infrastructure includes the physical cables, such as Ethernet or fiber optic, that connect the physical systems to routers, switches, and other networking equipment that provides the desired interconnectivity.

The physical resources 504 use hypervisors to provide a virtual computing environment that provides the virtual resources 512. Specifically, the hypervisors provide virtual hardware to guest operating systems. A physical computing system may provide one or more virtual machines for use by guest operating systems. The virtual resources 512 include virtual computing resources 514, virtual storage resources 516, and virtual network resources 518. Such virtual resources 512 may emulate their underlying physical resource counterparts.

The virtual computing resources 514 include virtual processors that execute machine readable instructions as a physical processor does. The hypervisor then maps the execution of those instructions to execution of instructions on a physical processor. The architecture of the virtual processor does not necessarily have to match the architecture of the underlying physical processor, which allows a variety of instruction set architectures to be used for various virtual machines.

The virtual storage resources 516 include short term and long term storage services. Specifically, the virtual machines may include virtual memory that is then mapped to physical memory by the hypervisor. There does not necessarily have to be a one-to-one mapping of virtual memory to physical memory. For example, two gigabytes of virtual working memory may be mapped to only one gigabyte of working memory in the physical system. Various paging techniques are then used to swap physical memory from working memory to a volatile storage memory to allow for such mapping.

Each virtual machine may run a guest operating system. The guest operating system may be similar to a host operating system. For example, the guest operating system may also be Linux. The guest operating system runs applications and provides such applications with access the virtual hardware of the virtual machines. For example, the guest operating system schedules processing tasks associated with the applications on the virtual processor. The guest operating system also provides the application with access to virtual memory associated with the virtual machines.

When the guest operating system provides applications running thereon with access to the virtual resources, the hypervisor of the underlying physical computing systems then maps those resources to the underlying physical resources. For example, when an application running on the guest operating system stores data in virtual memory, the hypervisor translates a virtual memory address into a physical memory address and the data is stored at that physical memory address. When the guest operating system schedules processing tasks for execution on the virtual processor, the hypervisor translates those processing tasks into executable instructions for the physical processor.

The virtual machines that are provided as part of the virtual resources 512 can be interconnected to each other through one or more virtual networks that make up the virtual networking resources 518. Such virtual networks emulate physical networks. Virtual networks may include a number of machines, both physical and virtual, that are assigned a virtual network address. The virtual networks can also isolate sets of virtual machines as desired. This can be helpful if some virtual machines are owned and/or operated by one entity and other virtual machines are owned and/or operated by another entity.

The NFVI 502 is managed by an infrastructure manager 524, which is part of the NFV management module 540. The infrastructure manager 524 may operate under a set of pre-defined rules that instruct the infrastructure manager how to manage the NFVI 502. Such rules may be adjusted by a human operator as desired. For example, such rules may instruct the infrastructure manager 524 how to provision additional virtual machines when instructed to do so. The infrastructure manager 524 may include hardware, software, or a combination of both to perform various management functions. For example, the infrastructure manager 524 may be an application that resides on one or more physical machines and can receive input from human administrators as well as other management functions. The infrastructure manager 524 can then manage the physical and virtual environment as appropriate. For example, if it is determined that more virtual machines are desired, then the infrastructure manager 524 can send an instruction to the NFVI to create an additional virtual machine and configure it for use by whatever entity uses that virtual machine. Additionally, the infrastructure management can cause the physical computing systems to enter standby mode if less physical computing power is desired. The infrastructure manager 524 can also take such physical computing systems out of standby mode when more computing power is desired.

In the present example, the infrastructure manager 524 includes two components. Specifically, the infrastructure manager 524 includes a cloud manager 530 and an SDN controller 532. The cloud manager 530 is responsible for managing the cloud computing environment provided by the virtual resources 512 of the NFVI 502. For example, the cloud manager 530 may be responsible for provisioning additional virtual machines within the cloud computing environment when instructed to do so. The cloud manager 530 may have access to a set of pre-defined rules. Such rules may be configured and/or defined by a human administrator. Such rules may be stored as a data structure in physical memory. In one example, such rules may instruct the cloud manager 530 how to tear down a virtual machine when instructed to do so. One example of a cloud manager 530 includes the open-source cloud computing software platform provided by the Openstack Foundation under the name OpenStack™.

The SDN controller 532 is used to control the network resources of the NFVI 502. The SDN controller 532 may control both the physical network resources 510 and the virtual network resources 518. As will be described in further detail below, the SDN controller 532 receives instructions from various applications for how to configure the network infrastructure. The SDN controller 532 may have access to a set of pre-defined rules. Such rules may be configured and/or defined by a human administrator. Such rules may be stored as a data structure in physical memory. One example of a rule used by the SDN controller 532 may be how to establish virtual network connections when instructed to do so.

As described above, a VNF 520 represents a virtualization of specific telecommunication functions that are typically performed by specialized pieces of hardware. Examples of a VNF 520 include, but are not limited to, an SBC, an Internet Protocol (IP) Multimedia Subsystem (IMS) core, and a telephony application server. A VNF 520 may include a number of components, or instances of an application, that run within the virtual machine environment. Such applications are designed to emulate the specialized pieces of telecommunication hardware. Thus, instead of setting up a new physical piece of specialized equipment, a service provider can simply spin up a virtual machine environment and run applications. Each VNF 520 has a corresponding Element Management System (EMS) 522. The EMS 522 includes a user interface, or a dashboard, that allows an administrator to configure the VNF 520 as desired. To provide full NFV, several VNFs work together to provide the desired services. In the present example, a plurality of VNFs 520-1, 520-2 . . . 520-$n$ and corresponding EMSs 522-1, 522-2 . . . 522-$n$ are used to provide NFV.

An EMS 522 may have access to a set of pre-defined rules. Such rules may be configured and/or defined by a human administrator. Such rules may be stored as a data structure in physical memory. One example of a rule used by an EMS 522 may define what statistics should be collected regarding operation of the VNF 520.

A VNF 520 typically includes several different components, which may or may not be identical, that together form the full VNF 520. For example, the different components may be different instances of the VNF application. The different instances then work together to provide the functionality of the full VNF 520. Multiple VNFs 520 are then used in concert to provide a telecommunication network for a telecommunication service. A telecommunications network is an infrastructure that provides communication services between multiple subscribers. One example of a communication service is a Voice over IP (VoIP) service. Such services typically include several pieces of specialized hardware that perform specific network functions. However, according to principles described herein, the VNF 520 provides such functions instead of a specialized piece of hardware.

A VNF 520 may be part of a telecommunications core network. The core network is the central part of a telecommunications networks. The core network provides various communication services to the subscribers such as voice communication. Subscribers are connected to the core network through an access network, which will be described in further detail below. In some examples, the VNF component can communicate with the core network over a first network and communicate with the access network over a second network. The first network is isolated from the second network such that communication between the VNF and the core network does not traverse the same physical network components as the communication between the VNF and the access network.

The VNFs 520 are managed by a VNF manager 526, which is part of the NFV management module 540. In some cases, there may be multiple VNF managers 526, each managing one or more specific VNFs 520. The VNF manager 526 can manage the VNFs based on network demand. For example, at peak times, the VNF manager 526 can start up new instances of VNF components to scale dynamically according to demand. While there may be several VNF managers 526, there is a single orchestrator 528 that manages the VNF managers 526 and thus manages the entire NFV service. The VNF manager 526 may have access to a set of pre-defined rules. Such rules may be configured and/or defined by a human administrator. Such rules may be stored as a data structure in physical memory. One example of a rule used by the VNF manager 526 may be when to instruct the cloud manager 530 to provision an additional virtual machine. For example, when demand for services reaches a certain threshold of capacity, the VNF manager 526 can instruct the cloud manager to provision an additional virtual machine so that an additional VNF component can be provisioned.

Each of the VNFs may correspond to virtual machines of a process node as described above. Particularly, each VNF 520 may handle transcoding functions for a particular set of calls. The VNF 520 may thus monitor those calls and toggle on the enhanced mode (e.g., channel aware mode) in the manner described above Using principles described herein, network components are able to improve their performance by using resources more efficiently to provide robust call quality and error resilience. For example, network systems are able to better utilize the channel aware mode of the EVS codec to use it only when needed and seamlessly turn it on and off.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
    processing a communication session with a first virtual machine of a plurality of virtual machines associated with a network node;
    monitoring packet loss on a leg of the communication session between a first endpoint and a second endpoint;
    in response to determining that the packet loss exceeds a first threshold, toggling on an enhanced mode for a codec associated with the communication session, the enhanced mode providing increased error resilience; and
    in response to determining that the toggling on the enhanced mode causes the first virtual machine to exceed a processing capacity threshold, moving the communication session to a second virtual machine of the plurality of virtual machines and continuing processing the communication session with the second virtual machine with the enhanced mode toggled on.

2. The method of claim 1, further comprising, in response to determining that the packet loss falls below a second threshold, toggling off the enhanced mode.

3. The method of claim 1, further comprising, provisioning an additional virtual machine to the plurality of virtual machines in response to determining that capacity exceeds a predefined threshold.

4. The method of claim 1, further comprising, decommissioning one of the plurality of virtual machines in response to determining that capacity falls below a predefined threshold.

5. The method of claim 1, wherein the network node comprises a Media Resource Function Processor (MFRP) node.

6. The method of claim 1, wherein the codec comprises Enhanced Voice Services (EVS).

7. The method of claim 6, wherein the enhanced mode comprises channel aware mode.

8. The method of claim 1, wherein toggling on the enhanced mode is performed by sending a SIP invite to renegotiate the communication session with the enhanced mode on.

9. The method of claim 1, wherein an ability to toggle the enhanced mode on or off is negotiated at a start of the communication session.

10. The method of claim 1, wherein the enhanced mode defaults to being off when the communication session starts.

11. A system comprising:
    a processor; and
    a memory comprising machine readable instructions that when executed by the processor, cause the system to:
    process a communication session between a first endpoint and a second endpoint over a network;
    toggle on an enhanced mode for a codec associated with the communication session, in response to detecting a first change in network conditions;
    move the communication session from being processed by a first virtual machine to a second virtual machine in response to determining that toggling on the enhanced mode increases processing capacity of the first virtual machine above a processing capacity threshold; and
    continue processing the communication session with the second virtual machine with the enhanced mode toggled on.

12. The system of claim 11, wherein the first change in network conditions comprises an increase in packet loss.

13. The system of claim 11, wherein moving the communication session from being processed by the first virtual machine to the second virtual machine is done without changing network addresses associated with the communication session.

14. The system of claim 13, wherein the enhanced mode comprises channel aware mode.

15. The system of claim 11, wherein the system is further configured to toggle off the enhanced mode in response to determining a second change in network conditions.

16. The system of claim 15, wherein the second change in network conditions comprises a decrease in packet loss.

17. The system of claim 11, wherein the enhanced mode provides additional error resilience by packing redundant data in adjacent packets.

18. A computer program product comprising machine-readable instructions on a non-transitory storage medium of a network node for facilitating a communication session among endpoints in a communication network, the computer program product comprising:

code to monitor packet loss on a leg of the communication session between a first endpoint and a second endpoint, the communication session being processed by a first virtual machine of a plurality of virtual machines associated with the network node;

code to toggle on an enhanced mode for a codec associated with the communication session in response to determining that the packet loss exceeds a high threshold, the enhanced mode providing increased error resilience;

code to move the communication session to a second virtual machine of the plurality of virtual machines in response to determining that the first virtual machine has exceeded a processing capacity threshold after toggling on the enhanced mode; and code to continue processing the communication session with the second virtual machine with the enhanced mode toggled on.

19. The computer program product of claim 18, further comprising code to toggle off the enhanced mode in response to determining that the packet loss falls below a low threshold.

20. The computer program product of claim 18, wherein the codec comprises Enhanced Voice Services (EVS) and the enhanced mode comprises channel aware mode.

* * * * *